Figure 1:
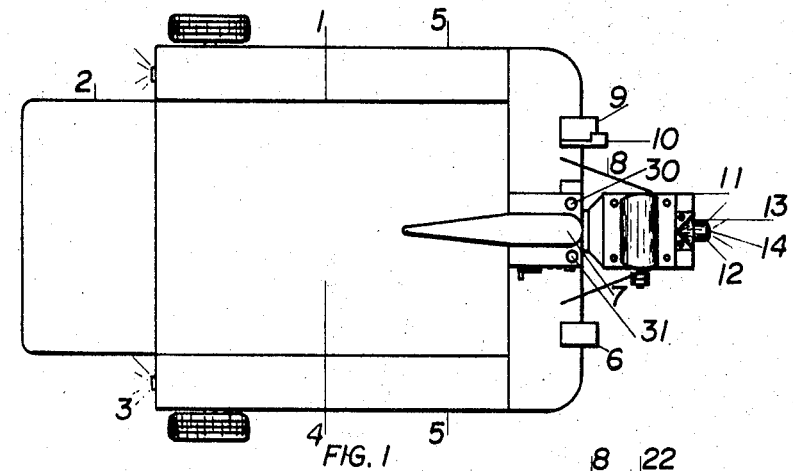

United States Patent

[11] 3,572,455

[72] Inventor Vern Alvin Brueske
       Rte 1, Box 90C, Del Mar, Calif. 92014
[21] Appl. No. 731,987
[22] Filed May 24, 1968
[45] Patented Mar. 30, 1971

[54] SELF-PROPELLED, ELECTRIC, THREE WHEEL MAINTENANCE CART
2 Claims, 6 Drawing Figs.

[52] U.S. Cl. .................................................. 180/26, 180/65
[51] Int. Cl. .......................................... B60l 11/00
[50] Field of Search........................................ 180/26, 65, 13, 15; 296/61; 280/289, 25, 27, (MGC Digest)

[56] References Cited
UNITED STATES PATENTS

| | | | |
|---|---|---|---|
| 1,492,701 | 5/1924 | Cockran...................... | (180/65UX) |
| 1,663,299 | 3/1928 | Grist............................ | 180/26 |
| 2,767,800 | 10/1956 | Joy................................ | 180/13 |
| 3,099,326 | 7/1963 | Weigel et al. ................. | 180/26 |
| 3,219,137 | 11/1965 | Appleton...................... | 180/26 |
| 1,346,915 | 7/1920 | Sauvage ....................... | 180/26 |
| 3,204,791 | 9/1965 | Williams....................... | 296/61X |
| 3,212,596 | 10/1965 | Johnson ....................... | 180/26 |
| 3,352,440 | 11/1967 | Wilson ......................... | 296/61X |
| 3,416,837 | 12/1968 | Saunders....................... | 280/289(S) |

*Primary Examiner*—Kenneth H. Betts

ABSTRACT: The invention includes a three-wheeled, self-propelled, all purpose vehicle with a large cart-type body, driven by an electric motor on a box-shaped slotted fork just forward of the handlebars and utilizing storage batteries, connected in series, with provision for recharging, with a power train to connect and drive a single, front traction wheel, and with a banana seat for the operator, just behind the motor, over a control box fitted with speed control and reverse lever setting contacts, and brake and on-off pedals at the front end of a large cart bed area with a low center of gravity, and with box-type seats running longitudinally along both sides of the cart for the storage batteries, and also with a high tailgate in rear, when the UP position, but for use in the DOWN position as a low-angle ramp. The cart operates air pollution free. Maintenance is simple because both the motor and the batteries are easily accessible, Use inside buildings or warehouses as well as outside on pavements, turf or bare ground is favored because of its quite operation, freedom from exhaust fumes and safely from fire or explosion because there is no flammable fuel tank.

Patented March 30, 1971

3,572,455

SELF-PROPELLED, ELECTRIC, THREE WHEEL MAINTENANCE CART

The invention relates generally to an improved, self-propelled, electric, three-wheel maintenance cart and, in particular, to a direct-current, battery-powered, adjustable base, electric motor, mounted over a single front-drive wheel, on a maintenance cart.

The present invention is directed toward the safe and noiseless movement of workmen, equipment, tools and materials by electric power for the utility thereof. When offered for use in this manner, the safety of no flammable fuel in a tank required for gasoline power operation with attendant exhaust fumes and noise, and the silence of the operation is greatly preferred and now demanded, especially at hospitals, institutions, schools and golf links, over the muffler type, but still noisy gasoline engine maintenance cart. Larger machines may be built, following these cart-size drive principles, but they are more expensive and usually are intended for maintenance in an area where smog is a problem or quiet is mandatory such as at hospitals, asylums, schools, libraries and research laboratories.

The invention eliminates the need for gasoline engine maintenance and its gasoline and oil requirements and substitutes therefor a simple electric motor with minimum maintenance such as daily battery charging, weekly oiling of the motor and greasing of the running gear, quarterly belt and chain adjustment of the drive train from the motor to the single, front-drive wheel and annual motor brush adjustment. The improved maintenance cart enjoys long life as well as inexpensive maintenance, all at low first cost.

The invention consists of an electric motor-operated maintenance cart that is of novel construction with the motor mounted directly over the fork of the single, front-drive wheel. The maintenance cart is steered like a motorcycle with handlebars extending upward from the fork by an operator sitting on a banana-type seat over the three-speed control box. The entire machine is fabricated from steel axles, plate, shapes, pneumatic rubber-tired wheels, sprockets, chain, belts, sheaves, motor, insulated copper wire, batteries, switches, recharge socket, ammeter, voltmeter, foot pedals, latch lock, lights and horn.

It is a primary object of the invention to provide a maintenance cart that operates silently without hazard for flammable fuel. A similar object provides the means of moving personnel, tools, equipment and materials across country.

Another object provides for a direct-current, adjustable base, electric motor mounted directly on the slotted fork of the front-drive wheel of the maintenance cart.

A further object provides for a front wheel drive train, consisting of a belt drive from an electric motor sheave to an idler shaft sheave and then from an idler shaft sprocket to a single-drive wheel sprocket by a linked chain.

Still another object provides for six 6-volt batteries connected in series to drive the electric motor of 1½horsepower with takeoff voltages to operate the lights and horn.

Yet another object of the invention provides for a 3-speed electric control box, located below the banana-type operator's seat, with three resistors, recharge socket to recharge the batteries, on-off reverse, light and horn circuit switches.

Another object resides in the provision of a low center of gravity for the cart to create more stability for the machine when operating over rough terrain by means of lowering the frame of the cart and rear axle closer to the ground.

Another object provides greater floor area in the bed of the cart to carry all sizes of lawn mowers, more maintenance personnel and more tools and materials including steel drums.

Another object provides a lower-angled incline of the tailgate ramp when lowered which permits easier and quicker loading and unloading of equipment, heavy tools and materials.

Another object provides low boxes, located along the sides of the cart for the storage batteries and series wire connections, the covers of which provide seats for personnel when carried.

Another object provides for a high tailgate, which when lowered forms a low-incline ramp for easy loading and unloading of the cart.

Another object provides for control of the cart by the operator utilizing lights, horn, handlebars, foot brake, on-off foot pedal with latch lock and speed and reverse switches.

Still another object provides a minimum first cost and maintenance machine.

Yet still another object is environmental control since the cart operates quietly, inside or outside, entirely free from exhaust fumes and, hence, with no air pollution whatsoever and safely from fire and explosive dangers since there is no fuel tank.

Figure 2:
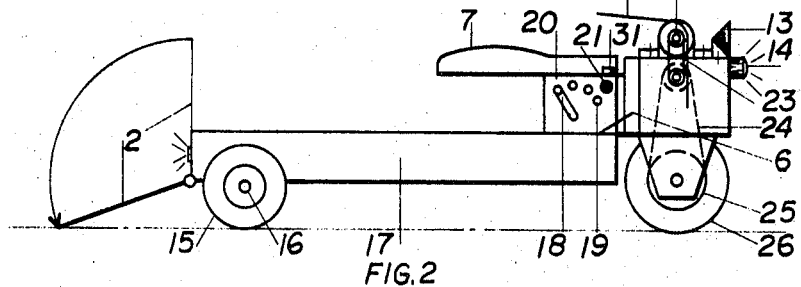
Figure 3:
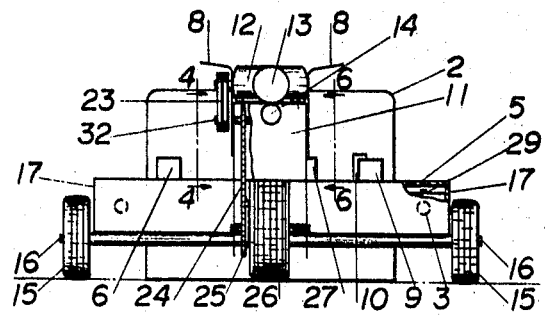
Figure 5:
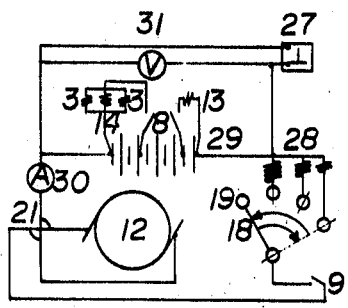
Figure 6:
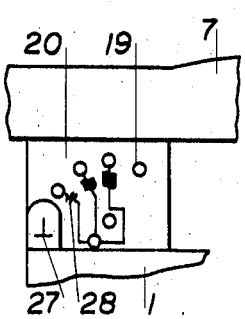

Other ancillary objects will be apparent from the following description when read in the light of the drawing in which:

FIG. 1 shows a plan view of the cart; FIG. 2 is side elevation view of the cart; FIG. 3 is a front view; FIG. 3 is an enlarged fragmentary view taken on the line 14–14 of FIG. 3; FIG. 5 shows the direct-current wiring diagram; and FIG. 6 is an enlarged fragmentary view taken on the line 6–6 of FIG. 3.

FIG. 1 is a plan view of the improved maintenance cart 1, showing the tailgate 2 with ramp down, tail lights 3, bed of cart 4, seats 5 along sides of cart over the battery boxes 17, banana-type operator's seat 7, handlebars 8, on-off left foot penal 9, latch lock 10, front wheel fork 11, electric motor 12, horn 13, headlight 14, ammeter 30 and voltmeter 31.

FIG. 2 is an elevation of the improved maintenance cart 1, showing the tailgate 2 ramp inclined and in the up position, rear wheel 15, axle 16, battery box 17, control box 20, speed switch 18, contact 19, reverse switch 21, belt 23 and chain 24 drives with sheaves 22 and sprockets 25, front-drive wheel 26, banana-type seat 7, handlebars 8, horn 13, headlight 14 and foot brake pedal 6.

FIG. 3 is a front view, partly in section, of the improved maintenance cart 1, showing the three-wheel cart 1, rear wheel 15, axle 16, battery box 17, seat 5, high tailgate 2 in up position, front wheel fork 11 carrying electric motor 12, horn 13, headlight 14, handlebars 8, belt 23 and chain 24 drives, idler shaft 32, foot brake pedal 6, tail light 3, on-off foot pedal 9, latch lock 10, recharge socket 27 and battery 29.

Figure 4:
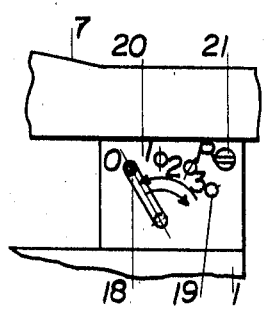

FIG. 4 is an enlarged, fragmentary view of the contact 19 side of the control box 20 long the line 4–4, showing the speed switch 18 with handle, contacts 19 (0,1,2,3) for on-off position, which is also connected to the left foot on-off pedal 9 with latch lock 10, and three speed positions, reverse switch 21 (R), banana-type seat 7 and maintenance cart 1.

FIG. 5 is a direct-current wiring diagram showing a 1½horsepower motor 12, on-off switch located at left foot pedal 9, headlight 14 and tail lights 3 switch located on the left handlebar 8 near grip, horn 13 switch located on the right handlebar 8 near grip, reverse switch 21, resistors 28, contacts 19 and recharge socket 27 all located in the control box 20, with an ammeter 30 (A) in the line and a voltmeter 31 (V) across all the batteries 29 connected in series.

FIG. 6 is an enlarged, fragmentary view of the wiring side of the control box 20 with cover removed along the line 6–6, showing the recharge socket 27, contacts 19 connected to resistors 28, banana-type seat 7 and maintenance cart 1.

Along the top of the control box 20 a tube projects forward horizontally and connects to a vertical pin fixed in the center of the top part of the front wheel fork 11 by means of a roller bearing, set vertically at the forward end of the tube, which rides at its top and bottom on ball bearings, the roller and ball bearings being centered on the pin, thus coupling the boxlike fork 11 to the cart 1, and allowing easier steering for the operator.

The frame, cart floor, boxes, tailgate, control box and fork of the cart are welded together from steel shapes and plate. The wheels, tires, lights, horn, motor, sprockets, chain, sheaves, belts, banana-type seat, handlebars, foot pedals, recharge socket, adjustment screws, reverse switch, batteries, contacts, insulated copper wire, terminals and bearings are all standard items. The axles and shafts are steel. The maintenance cart is usually painted a forest green color.

The invention may be utilized by adaptation to move other objects or persons than workmen or maintenance personnel, tools, equipment or materials.

For example, its use in general purpose hauling over pavement and/or cross country at warehouses, swimming pools, golf courses, sports fields, motels, hotels, etc., by an operator is anticipated in cart design for specific uses.

For illustrative purposes a form of the invention is shown and described herein, and the assembly applicable is disclosed; however, the invention is not limited to the details or form shown and major deviations from the illustrated form are possible without modifying the principles involved.

I claim:

1. An electric motor powered vehicle for use in general purpose hauling by an operator, the improvement comprising: vehicle platform frame which connects by horizontal tube to a vertical pin, fitted with roller and ball bearings, in the boxlike fork of a single driven front wheel, and two smaller rear idler wheels on a single axle, both connected to said frame, the assembly of which parts create a low center of gravity cart with covered battery boxes along the extent of both sides and with a hinged tailgate closure at the rear end and the electric motor speed control box centrally located at the front end, surmounted by a seat for the operator, and with handlebars for steering, and an electric motor with drive mechanism to the driven wheel for operating, mounted on the top of the boxlike fork between the handlebars, and foot and hand control means for separation of the vehicle.

2. An electric motor powered vehicle as set forth in claim 1 with provision for seats over the battery boxes.